(12) United States Patent
Choquette

(10) Patent No.: US 6,530,011 B1
(45) Date of Patent: Mar. 4, 2003

(54) METHOD AND APPARATUS FOR VECTOR REGISTER WITH SCALAR VALUES

(75) Inventor: Jack H. Choquette, Los Altos, CA (US)

(73) Assignee: SandCraft, Inc., Santa Clara, CA (US)

( * ) Notice: Subject to any disclaimer, the term of this patent is extended or adjusted under 35 U.S.C. 154(b) by 0 days.

(21) Appl. No.: 09/422,045

(22) Filed: Oct. 20, 1999

(51) Int. Cl.[7] .............................. G06F 15/82; G06F 7/38
(52) U.S. Cl. ..................... 712/3; 712/4; 712/5; 712/25; 708/236; 708/626
(58) Field of Search ................................ 712/2, 5, 4, 3, 712/7, 23, 48, 9, 35, 36, 10, 17, 34, 21, 22, 20, 18, 201, 229, 203, 41, 25; 708/504, 509, 520, 232, 510, 236, 523, 495, 522, 501, 503, 620, 607, 626, 630, 441

(56) References Cited

U.S. PATENT DOCUMENTS

| 4,803,620 A | * | 2/1989 | Inagami et al. ............. 712/203 |
| 4,837,730 A | * | 6/1989 | Cook et al. .................... 712/7 |
| 5,537,606 A | * | 7/1996 | Byrne ............................ 712/7 |
| 5,983,230 A | * | 11/1999 | Gilbert et al. .............. 708/520 |

* cited by examiner

*Primary Examiner*—Daniel H. Pan
(74) *Attorney, Agent, or Firm*—Blakely, Sokoloff, Taylor & Zafman LLP

(57) ABSTRACT

A method and an apparatus for implementing mixed scalar and vector values in a digital processing system. In one embodiment, a digital processing system, which contains processing unit and memories, is capable of identifying a first data in a first scalar register and a second data in a vector register. Upon fetching the first data as a first operand and the second data as a second operand, the processing unit performs an operation between the first and second operands in response to an operator. After operations, the result is subsequently stored in a second scalar register.

63 Claims, 12 Drawing Sheets

SCALAR REGISTER

SCALAR REGISTER

VECTOR REGISTER

```
  31      26 25     21 20      16 15      10 11       6 5    422  0
 ┌─────────┬──────────┬──────────┬──────────┬──────────┬────────┐
 │ OPCODE  │    SL    │  OP2.S   │  OP1.V   │  RST.S   │////////│   420
 │  432    │   430    │   428    │   426    │   424    │////////│
 └─────────┴──────────┴──────────┴──────────┴──────────┴────────┘
```

OPERATION:     RST.S [31:0] = OP1.V [31:0] OP OP2.S [31:0]

FIG. 4A

```
                                                       472
 ┌─────────┬──────────┬──────────┬──────────┬──────────┬────────┐
 │ OPCODE  │    SU    │  OP2.S   │  OP1.V   │  RST.S   │////////│   470
 │  482    │   480    │   478    │   476    │   474    │////////│
 └─────────┴──────────┴──────────┴──────────┴──────────┴────────┘
```

OPERATION:     RST.S [31:0] = OP1.V [63:32] OP OP2.S [31:0]

FIG. 4B

OPERATION: RST.V [31:0] = OP1.S [31:0] OP OP2.S [31:0]

OPERATION: RST.V [63:32] = OP1.S [31:0] OP OP2.S [31:0]

METHOD AND APPARATUS FOR VECTOR REGISTER WITH SCALAR VALUES

BACKGROUND OF THE INVENTION

1. Field of the Invention

The present invention relates generally to the field of digital processing architecture. More specifically, the present invention relates to the area of data mixed scalar and vector operations.

2. Description of the Related Art

In typical digital processing systems, processors are designed to be able to operate various data structures to satisfy various requirements, such as speech recognition, imaging processing, and sound emulation. Traditionally, a general data structure is designed to handle general values while a special data structure is often dedicated to handle special cases. For example, a vector data structure is typically a special data structure for handling vectors. Also, a scalar data structure is normally used as a data structure. Typically a scalar value is used for representing a quantitative value which has a single numerical component while a vector value includes multiple numerical components.

A scalar value, such as an area, length, mass, and temperature, is completely described when the magnitude of the quantity is identified. On the other hand, a vector value is not completely described until all related values, such as magnitude and direction, are specified. For example, a vector may describe an automobile's speed as well as its direction. Another example is that a vector may describe a speed, altitude, and direction of an airplane. Traditionally, a typical vector notation is $$u=(u_1, u_2, \ldots u_n)$$

$$v=(v_1, v_2, \ldots v_n)$$

where $u_1$ and $v_1$ are two vector values. The sum u+v is defined by $$u+v=[u_1+v_1, u_2+v_2, \ldots u_n+v_n)$$

Since a vector contains more than one value or element, a typical vector data structure, which stores more than one value, can improve system performance in the area of data access and data computations. For example, a vector register may store ($u_1$, $u_2$) or three values ($u_1$, $u_2$, $u_3$) vector values. Since vector values are stored differently from scalar values, or number of specialized vector execution units are typically employed for handling vector operations.

Consequently, a digital processing system containing vector execution units can typically implement following operations.

$$A_2=A_1 \text{op} A_0$$

$$B_2=B_1 \text{op} B_0$$

where A and B are vector values. The digital processing system should also be capable of implementing scalar operations. Such as $$S_2=S_1 \text{op} S_0$$

where S is a scalar value.

Although vector data and scalar data are structured differently, many computations require sharing between vector and scalar values. Accordingly, it is desirable to have a system that can implement mixed vector and scalar values in an operation.

SUMMARY OF THE INVENTION

A method and an apparatus of implementing mixed scalar and vector values in a digital processing system is disclosed. In one embodiment, a digital processing system, which contains a processing unit and memories, is capable of identifying a first data in a first scalar register and a second data in a vector register. Upon fetching the first data as a first operand and the second data as a second operand, the processing unit performs an operation between the first and second operands in response to an operator. Upon completion of the operation, the result is subsequently stored in a second scalar register.

In another embodiment, a digital processing device includes a microprocessor and a memory where the memory contains mixed scalar/vector instructions. Each mixed scalar/vector instruction indicates whether the operands are scalar or/and vector values and how to operate mixed scalar/vector operations.

BRIEF DESCRIPTION OF THE DRAWINGS

The invention is illustrate by way of example, and not limitation in the figures. Like reference indicate similar elements.

FIG. 4A illustrates an instruction using the lower portion of a vector register as one operand according to one embodiment of the invention.

FIG. 4B illustrates an instruction using the upper portion of a vector register as one operand according to one embodiment of the invention.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

This application describes a method and apparatus for implementing mixed scalar and vector values in a digital processing system. In one embodiment, a digital processing system contains execution unit, instruction decoder, register file, and memories where the digital processing system is capable of performing logic operations between a plurality of scalar and vector values. The result of the operation is subsequently stored in a second scalar register.

In another embodiment, a digital processing device includes a memory where the memory contains a set of mixed scalar/vector instructions. Each mixed scalar/vector instruction indicates whether the operands are scalar or vector values and how to operate mixed scalar/vector operations. Because of enhanced capability of mixing scalar/vector data sets, it increases overall system performance.

Figure 1:
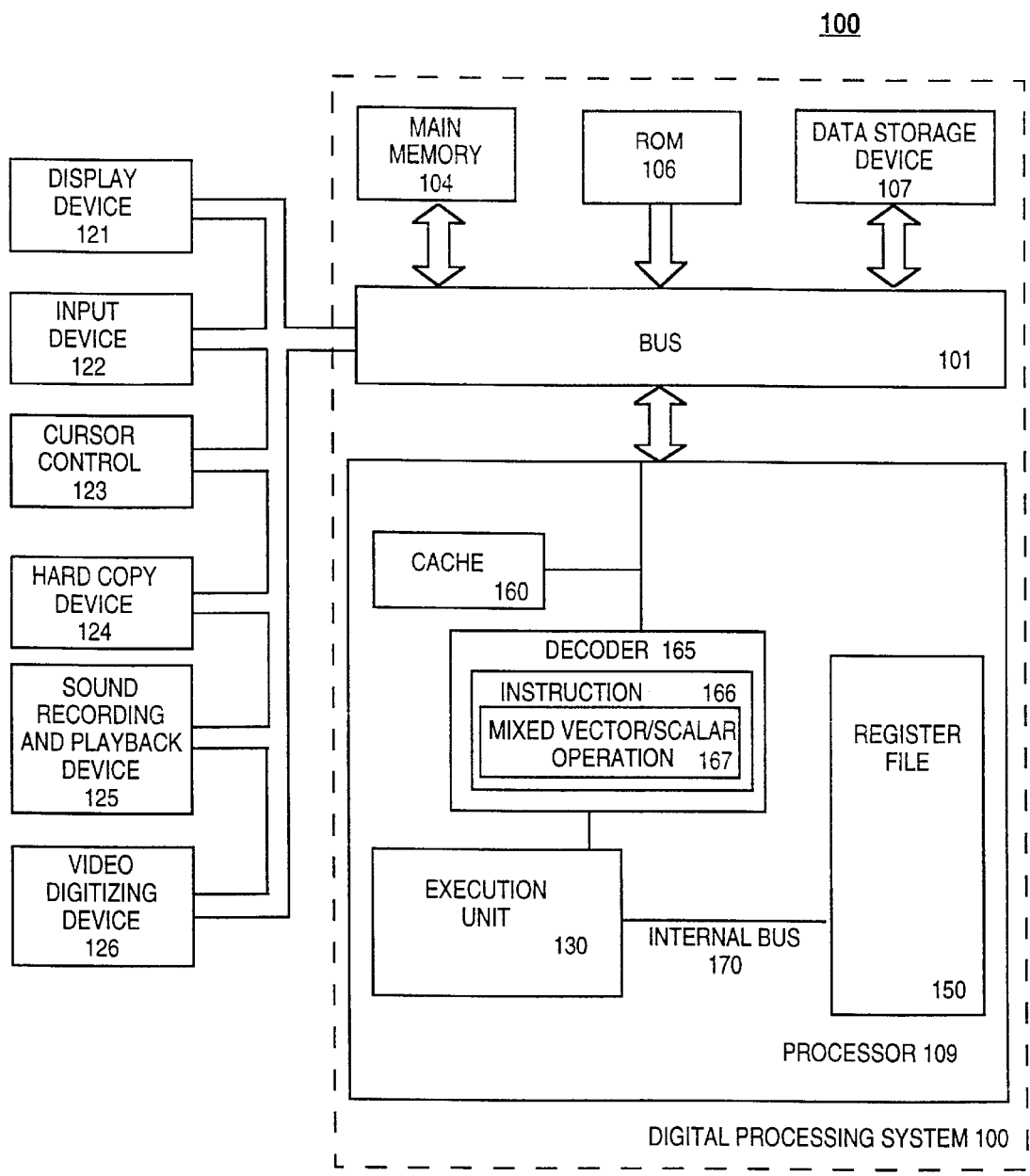
FIG. 1 illustrates an exemplary digital processing system according to one embodiment of the invention.

FIG. 1 illustrates an exemplary digital processing system 100 according to one embodiment of the invention. Digital processing system 100 includes a bus 101 or other communications hardware and software, for communicating information and a processor 109 coupled with bus 101 for processing information. Processor 109 represents a central processing unit of any type architecture. Including a CISC or RISC type architecture. Digital processing system 100 further includes a random access memory (RAM) or other dynamic storage device (referenced to as main memory 104), coupled to bus 101 for storing information and instructions to be executed by processor 109. Main memory 104 also may be used for storing temporary variables or other intermediate information during execution of instructions by processor 109. Digital processing system 100 also includes a read only memory (ROM) 106 and/or other static storage device coupled to bus 101 for storing static information and instructions for processor 109. Data storage device 107 is coupled to bus 101 for storing information and instructions.

FIG. 1 also illustrates that processor 109 includes an execution unit 130, a register file 150, a cache 160, a decoder 165, and an internal bus 170. Of course, processor 109 contains additional circuitry which is not necessary to understanding the invention.

Decoder unit 165 is used for decoding instructions received by processor 109. In addition to recognizing instructions typically implemented in general purpose processors, decoder unit 130 recognizes instructions in mixed vector/scalar instructions 166 for performing operations with vector/scalar values. Mixed vector/scalar instructions 167 perform logical operations using vector and scalar operands. Upon completion of the operation, the result is stored in a scalar register. Decoder 165 may be implemented using any number of different mechanisms (e.g., a look-up table, a hardware implementation, a PLA, etc.).

Execution unit 130 is coupled to register file 150 by internal bus 170. Register file 150 represents a storage area on processor 109 for storing information, including data. In one embodiment, register file 150 contains both vector and scalar registers. Execution unit 130 is coupled to cache 160 where cache 160 is used to cache data and/or control signals from, for example, main memory 104. In response to these control signals and/or microcode entry points, execution unit 130 performs the appropriate operations. For example, if an add instruction is received, decoder 165 causes execution unit 130 to perform the required addition; if a subtract instruction is received, decoder 165 causes execution unit 130 to perform the required subtraction; etc.

FIG. 1 additionally shows a data storage device 107, such as a magnetic disk or optical disk, and its corresponding disk drive, can be coupled to digital processing system 100. Digital processing system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121.

Another device which may be coupled to bus 101 is a hard copy device 124 which may be used for printing instructions, data, or other information on a medium such as paper, film, or similar types of media. Additionally, digital processing system 100 can be coupled to a device for sound recording, and/or playback 125, such as an audio digitizer coupled to microphone for recording information. Further, the device may include a speaker which is coupled to a digital analog (D/A) converter for playing back the digitized sounds.

Also, digital processing system 100 can be a terminal in a computer network (e.g., a LAN). Digital processing system 100 would then be a computer subsystem of a computer network. Digital processing system 100 optionally includes video digitizing device 126. Video digitizing device 126 can be used to capture video images that can be transmitted to others on the computer network.

It should be appreciated that the digital processing system 100 could be a personal computer, a mini-computer, a workstation, a mainframe computer, a network server, a printer, or a copy machine.

Figure 2:
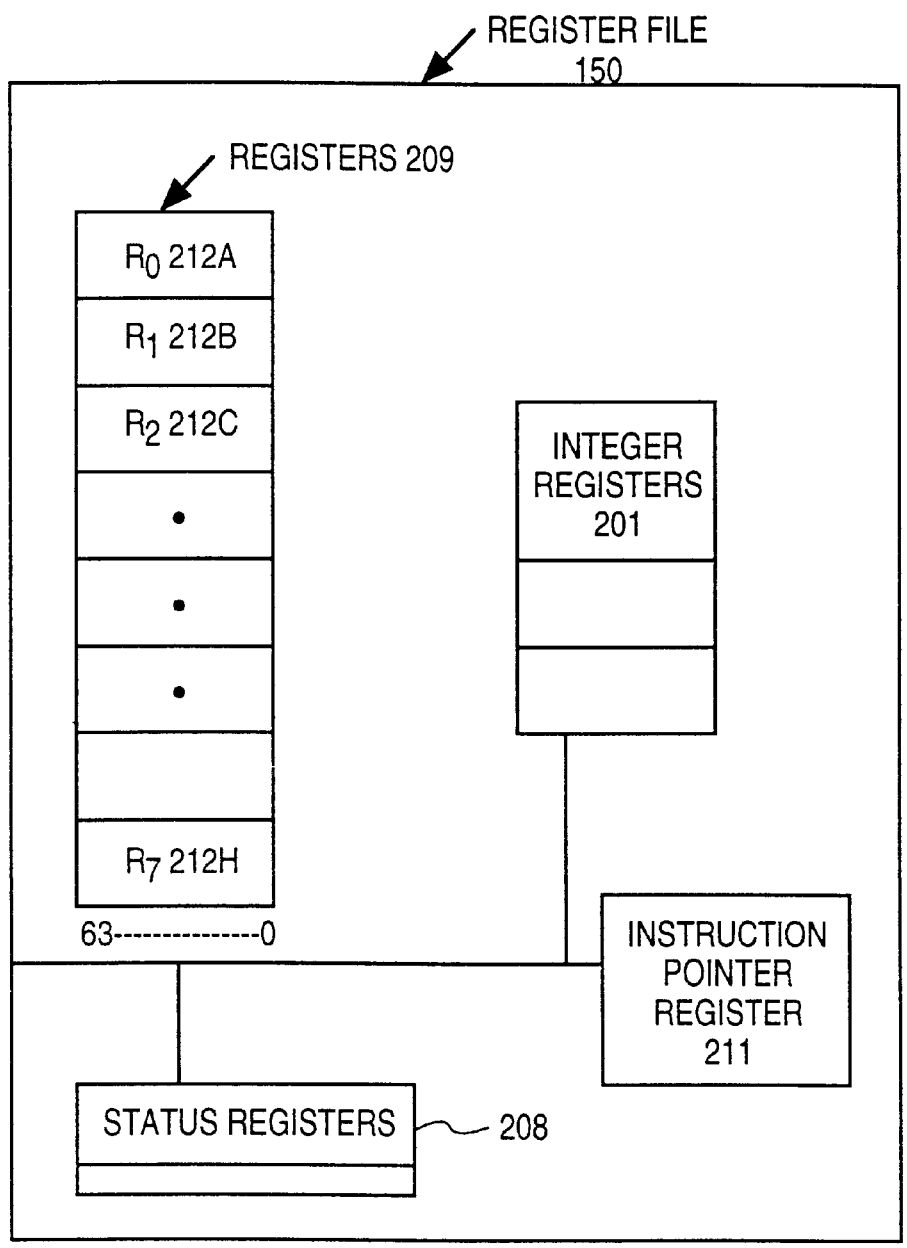
FIG. 2 illustrates a register file used in a processor according to one embodiment of the invention.

FIG. 2 illustrates the register file of the processor according to one embodiment of the invention. The register file 150 is used for storing information, including vector/scalar information, integer data, floating point data, and packed data. In the embodiment shown in a FIG. 2, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, and instruction pointer register 211 are all coupled to internal bus 170. Any additional registers would also be coupled to internal bus 170.

In one embodiment, the registers 209 are used for both vector data and scalar data. In one such embodiment, the processor 109, at any given time, must treat the registers 209 as being either vector register or scalar registers. In another such embodiment, the register file 150 contains two sets of registers where one set of registers is used for vector data while another set of registers is used for scalar data.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 contains eight registers, $R_0$ 212a through $R_7$ 212$_h$. $R_1$ 212a, $R_2$ 212b and $R_3$ 212c are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209.

Figure 3:
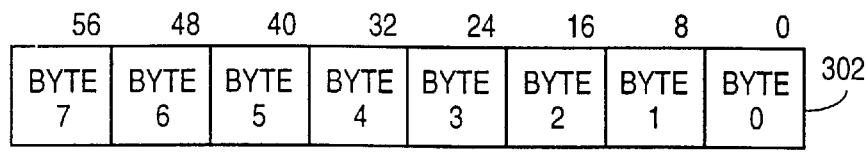
FIG. 3 illustrates data structures used in the digital processing system according to one embodiment of the invention.
Figure 3:
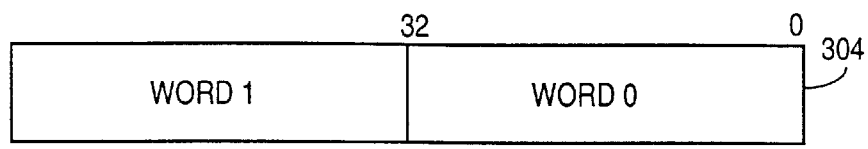
Figure 3:
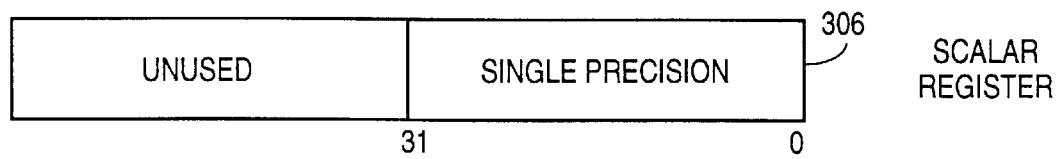
Figure 3:
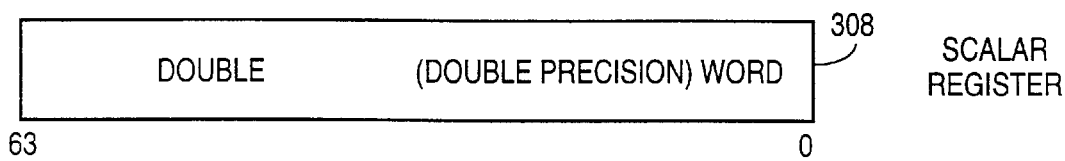
Figure 3:
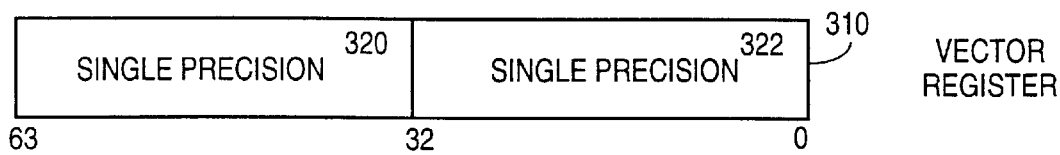

FIG. 3 illustrates a set of data structures 300 where each data structure is based on 64-bit data format used in one embodiment of the present invention. Data structures 300 shows different data structures that can are commonly employed for a digital processing system where data structure could be organized in bytes, words, and/or double words. In one embodiment, a word contains 32 bits while a double word contains 64 bits. Each double word 308 contains two words 304 or eight bytes as indicated in block 302.

It should be noted that a single word may hold a single precision value while a double word may hold a double precision value. In one embodiment, each general purpose register is 64 bits wide and it can hold two single precision values. In another embodiment, a general purpose register is 64 bits wide and it can hold one single precision value where the upper portion of the register is not used. In yet another embodiment, a vector value is 32 bits long with single precision. Consequently, a 64-bit general purpose register can hold up to two vector values.

FIG. 4A illustrates a lower vector/scalar instruction 422 in accordance with one embodiment of the invention. The lower vector/scalar instruction 422 contains a opcode field 432, a vector selection field 430, a second operand field 428, a first operand field 426, and a result field 424. The opcode field 432 indicates what logical operation is going to be performed. The second operand field 428 indicates a scalar register that contains the second operand and the first operand field 426 indicates a vector register that contains the first operand. The vector selection field 430 further indicates that the first operand is resided in the lower portion of the vector register. The result field 424 points to a scalar register where the result of the operation will be stored.

In one embodiment, the lower vector/scalar instruction 422 is used to implement the following logical operations.

$S_0 = S_1 \text{op} V_0^L$

Where S represents scalar value while $V_0^L$ represents lower vector register. Moreover, op represents a logical operation, such as an addition or a subtraction. In other words, the lower vector/scalar instruction 422 instructs the processor 109 to perform a logical operation between a vector operand and a scalar operand where the vector operand is loaded from the lower portion of the vector register.

In another embodiment, the first operand is a 32-bit single precision vector value. Similarly, the second operand is also a 32-bit single precision scalar value. The result of the operation is stored in the lower portion of a scalar register where the upper portion of the scalar register is undefined. Moreover, the logical operation is indicated by the opcode field of instruction 432. It should be appreciated that the vector value could be greater than 32-bit single precision data and the result of the operation could be stored in a 64-bit double precision register. In yet anther embodiment, the operation can specify one operand or more operands, where the vector selection can be applied to one or more of these operands.

It should be noted that the instructions are forms of computer program, which can be read from computer readable storage media.

FIG. 4B illustrates an upper vector/scalar instruction 472 in accordance with one embodiment of the invention. The upper vector/scalar instruction 472 contains a opcode field 482, a vector selection field 480, a second operand field 478, a first operand field 486, and a result field 474. The opcode field 482 indicates what logical operation is going to be performed. The second operand field 478 indicates a scalar register that contains the second operand and the first operand field 476 indicates a vector register that contains the first operand. The vector selection field 480 further indicates that the first operand is resided in the upper portion of the vector register. The result field 474 points to a scalar register where the result of the operation will be stored.

In one embodiment, the upper vector/scalar instruction 472 is used to implement the following logical operations.

$S_0 = S_1 \text{op} V_0^U$

Where S represents scalar value while $V_0^U$ represents upper vector register. Moreover, op represents a logical operation, such as an addition and a subtraction. In other words, the upper vector/scalar instruction 472 instructs the processor 109 to perform a logical operation between a vector operand and a scalar operand where the vector operand is loaded from the upper portion of the vector register.

In one embodiment, the first operand is a 32-bit single precision vector value. Similarly, the second operand is also a 32-bit single precision scalar value. The result of the operation is stored in the lower portion of a scalar register where the upper portion of the scalar register is undefined. It should be appreciated that the vector value could be greater than 32-bit precision data and the result of the operation could be stored in a 64-bit double precision register.

Figure 4C:
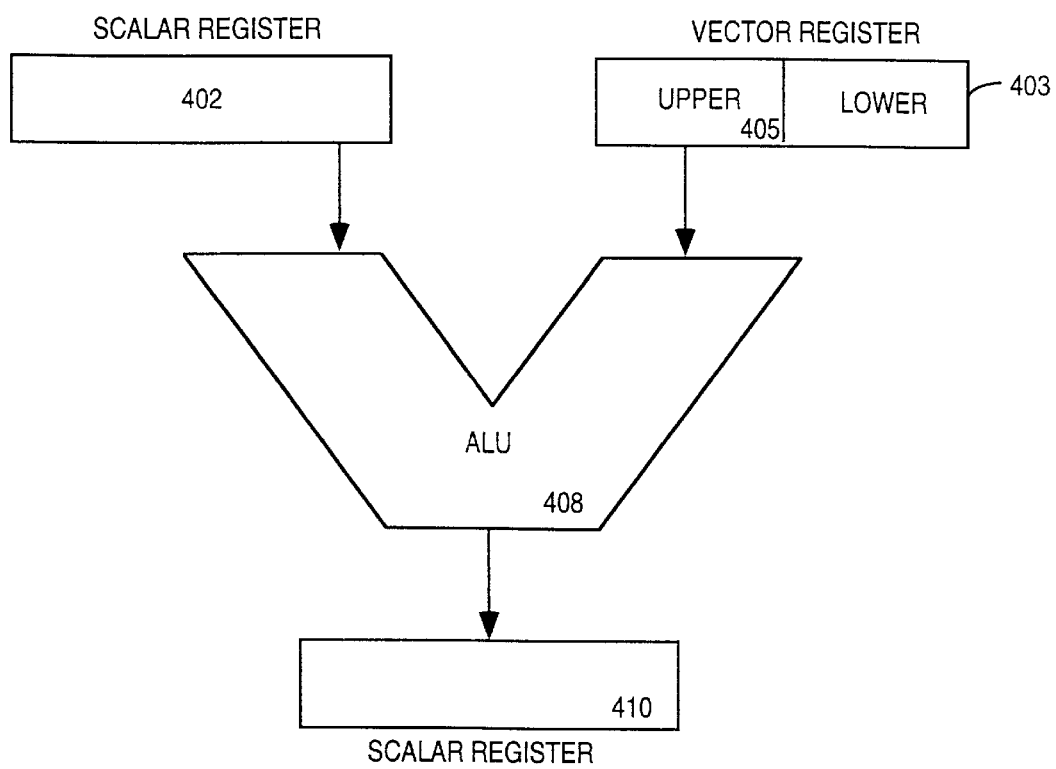
FIG. 4C illustrates a logic diagram of an operation using mixed scalar and vector values where the vector value is located in an upper portion of a vector register according to one embodiment of the invention.

FIG. 4C illustrates a logic diagram 400 performing a logic operation using mixed scalar and vector values where the vector value is fetched from an upper portion of a vector register. The logic diagram 400 contains a scalar register 402, a vector register 403, an arithmetic logic unit ("ALU") 408, and a scalar register 410. The vector register 403 further contains an upper and lower portions where each portion can hold a vector value.

In operation, ALU 408 receives one operand from the scalar register 402 and another operand from the upper portion 405 of the vector register 403. The operand from the scalar register 402 can be either a single or double precision scalar value. Likewise, the operand from the upper portion 405 of the vector register 403 may also be either a single or double precision vector value. Upon completion of the logical operation, the result of the operation is stored in the scalar register 410.

It should be noted that the register 410 could be the same register as the scalar register 402. For one embodiment, the scalar register 410 and the vector register 403 are the same register. Moreover, the scalar register 410, which stores the result of the operation, may contain a single or double precision data.

Figure 4D:
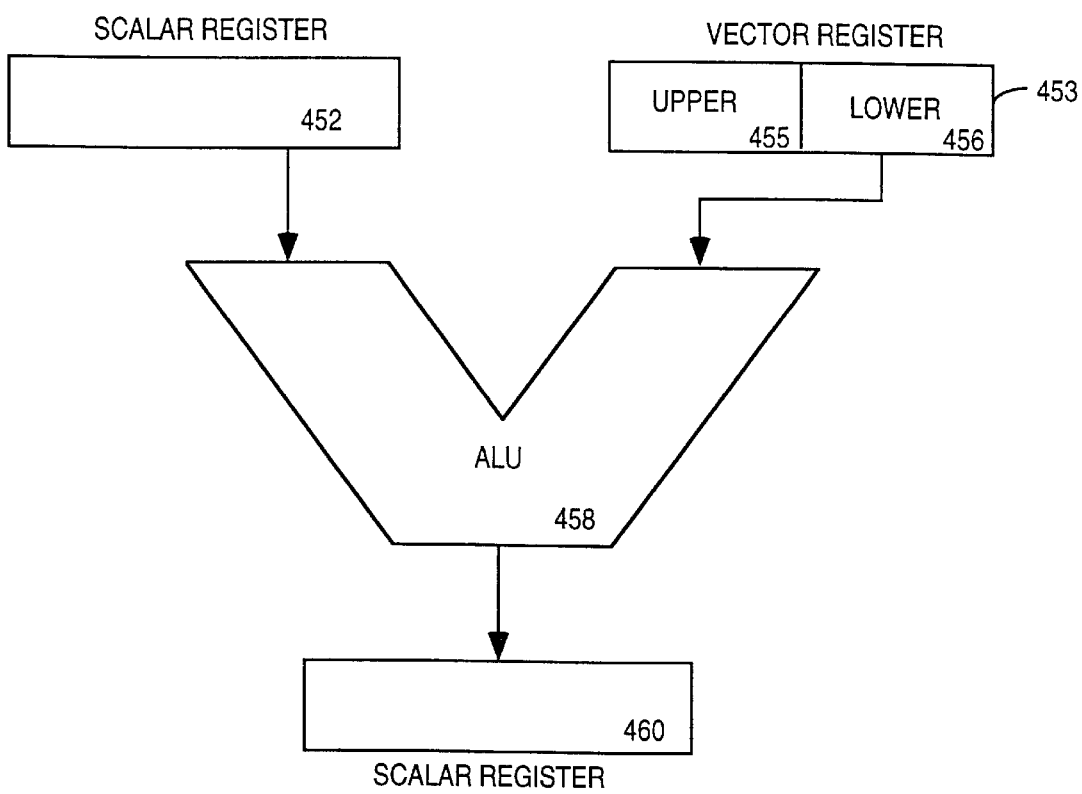
FIG. 4D illustrates a logic diagram of an operation using mixed scalar and vector values where the vector value is located in a lower portion of a vector register according to one embodiment of the invention.

FIG. 4D illustrates a logic diagram 450 of an operation between a scalar and vector values where the vector value is fetched from an lower portion of a vector register according to one embodiment of the invention. The logic diagram 450 contains a scalar register 452, a vector register 453, an arithmetic logic unit ("ALU") 458, and a scalar register 450. The vector register 453 further contains an upper portion and lower portion where each portion can hold a vector value.

In operation, ALU 458 receives one operand from the scalar register 452 and another operand from the lower portion 456 of the vector register 453. The operand from the scalar register 452 can be either a single or double precision scalar value. Likewise, the operand from the lower portion 456 of the vector register 453 may also be either a single or double precision vector value. Upon completion of the logical operation performed by ALU 458, the result of the operation is stored in the scalar register 460.

It should be noted that the register 460 and the register 452 could be the same register. For one embodiment, the scalar register 460 and the vector register 453 are the same register. Moreover, the scalar register 460 may hold a single or double precision data.

Figure 5A:
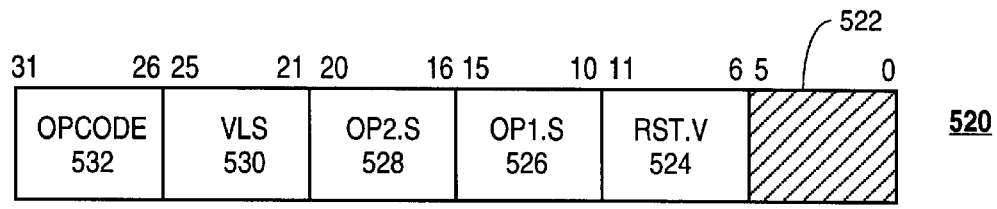
FIG. 5A illustrates an instruction to carry out an operation where the result of the operation is stored in a lower portion of a vector register according to one embodiment of the invention.

FIG. 5A illustrates an instruction 522 that stores the result of the operation in a lower portion of a vector register. The instruction 522 contains a opcode field 532, a vector selection field 530, a second operand field 528, a first operand field 526, and a result field 524. The opcode field 532 indicates what logical operation is going to be performed. The second operand field 528 indicates a scalar register that contains the second operand and the first operand field 526 indicates another scalar register that contains the first operand. The result field 524 points to a vector register where the result of the operation is to be stored. The vector selection field 530, also known as a vector lower result with scalar input (VLS), indicates that the lower portion of the vector register is to be used for storing the result of the operation.

In one embodiment, the instruction 522 is designed to implement the following logical operations.

$$V_2^L = S_0 \text{ op } S_1$$

Where S represents scalar value while $V_2^L$ represents lower vector register. Moreover, op represents a logical operation, such as an addition and a subtraction. In other words, the instruction 522 instructs the processor 109 to perform a logical operation between two scalar operands and to store the result of the operation in the lower portion of a vector register.

In one embodiment, the first and second operands are 32-bit single precision vector values. The result of the operation is stored in the lower portion of a vector register. Moreover, the logical operation is indicated by the opcode field of instruction 532. It should be appreciated that the scalar value could be greater than 32-bit single precision and the result of the operation could be stored in a 64-bit double precision register.

Figure 5B:
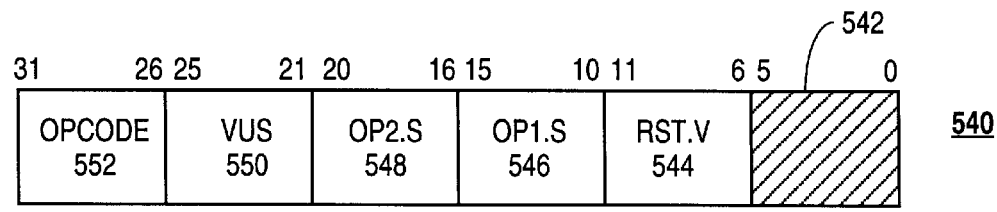
FIG. 5B illustrates an instruction to carry out an operation where the result of the operation is stored in an upper portion of a vector register according to one embodiment of the invention.

FIG. 5B illustrates an instruction 542 that stores the result of the operation in an upper portion of a vector register. The instruction 542 contains a opcode field 552, a vector selection field 550, a second operand field 548, a first operand field 546, and a result field 544. The opcode field 552 indicates what logical operation is going to be performed. The second operand field 548 indicates a scalar register that contains the second operand and the first operand field 546 indicates another scalar register that contains the first operand. The result field 544 points to a vector register where the result of the operation is to be stored. The vector selection field 550, also know as a vector upper result with scalar input (VUS) indicates that the upper portion of the vector register is to be used for storing the result of the operation.

In one embodiment, the instruction 542 is designed to accomplish the following logical operations.

$$V_2^U = S_0 \text{ op } S_1$$

Where S represents scalar value while $V_2^U$ represents the upper vector register. Moreover, op represents a logical operation, such as an addition and a subtraction. In other words, the instruction 542 instructs the processor 109 to perform a logical operation between two scalar operands and to store the result of the operation in the upper portion of a vector register.

In one embodiment, the first and second operands are 32-bit single precision vector values. The result of the operation is stored in the upper portion of a vector register. Moreover, the logical operation is indicated by the opcode field of instruction 532. It should be appreciated that the scalar value could be greater than 32-bit single precision and the result of the operation could be stored in a 64-bit double precision register.

Figure 5C:
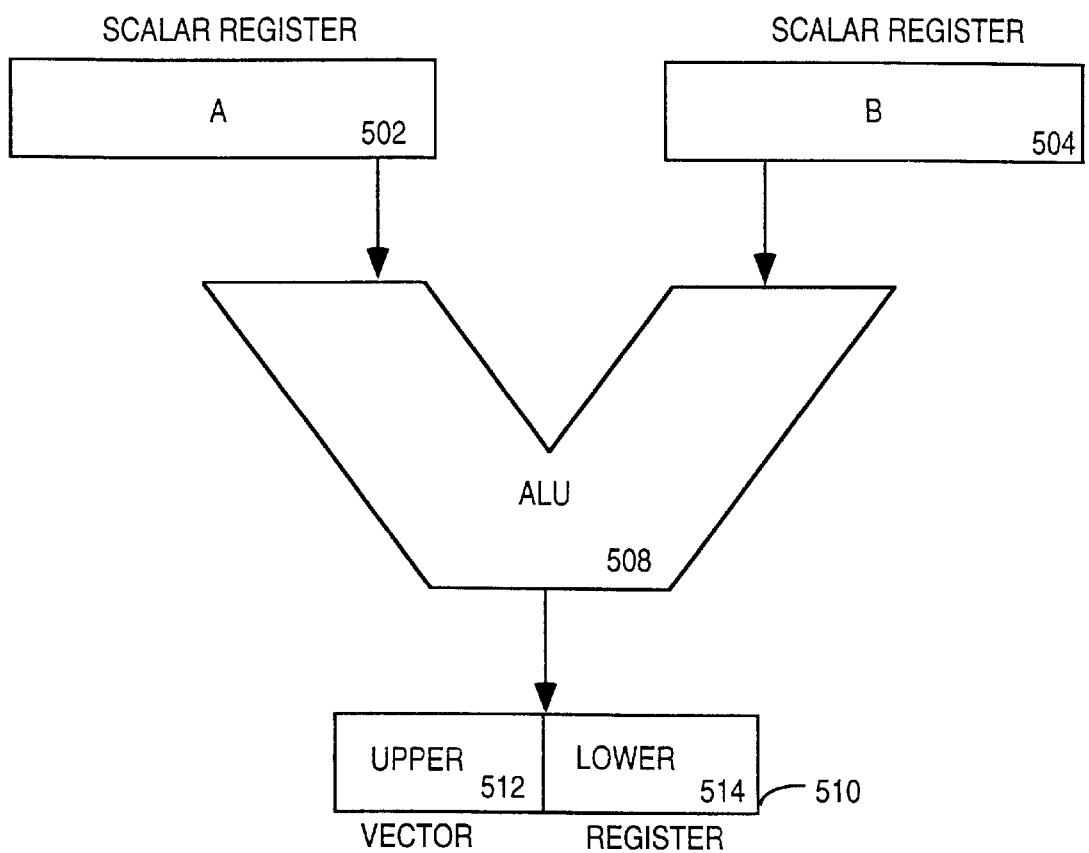
FIG. 5C illustrates a logic diagram for carrying out an operation where the result of the logic operation between two scalar values is stored in a vector register according to one embodiment of the invention.

FIG. 5C illustrates a logic diagram 500 performing a logic operation between two scalar values where the result of the operation can either be stored in a lower or upper portion of a vector register. The logic diagram 500 contains a scalar register 502, a scalar register 504, an ALU 508, and a vector register 510. The vector register 510 further contains an upper and lower portions where each portion can hold a vector value.

In operation, ALU 508 receives one operand from scalar register 502 and another operand from scalar register 504. The operand from scalar register 502 can be either a single or double precision scalar value. Likewise, the operand from scalar register 504 may also be either a single or double precision vector value. Upon completion of the logical operation, the result of the operation is stored in vector register 510. It should be noted that the vector register 510 and scalar register 502 or 504 could be the same register. Moreover, vector register 510, which stores the result of the operation, may contain a single or double precision data.

In one embodiment, two banks of registers are dedicated where the first bank stores scalar values while the second bank stores vector values. In another embodiment, a register file containing multiple general purpose registers is used for both scalar and vector registers. In this embodiment, each general purpose register in the register file can be dynamically assigned as a scalar register or a vector register.

Figure 6A:
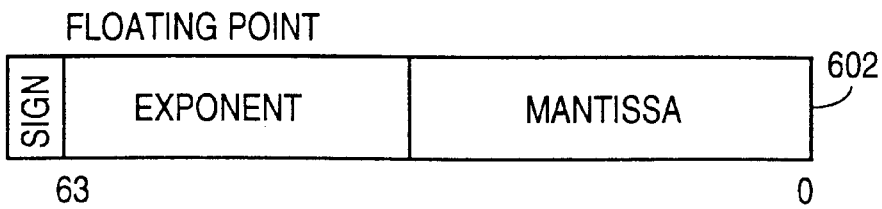
FIG. 6A illustrates floating point data structures according to one embodiment of the invention.
Figure 6A:
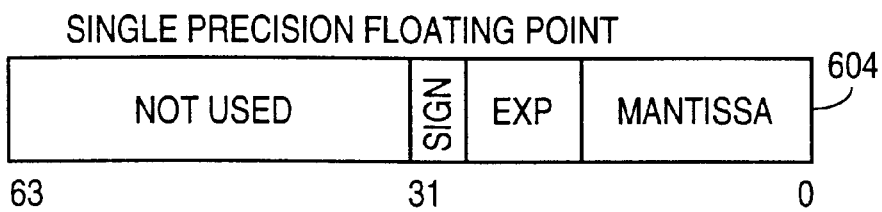
Figure 6A:
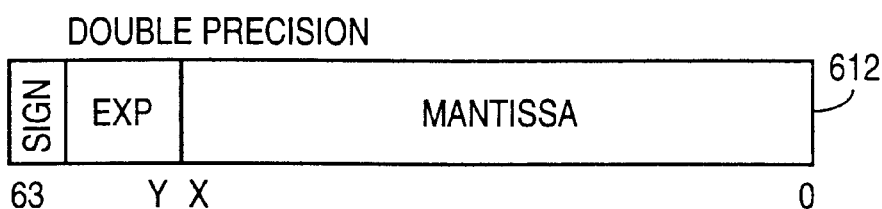
Figure 6B:
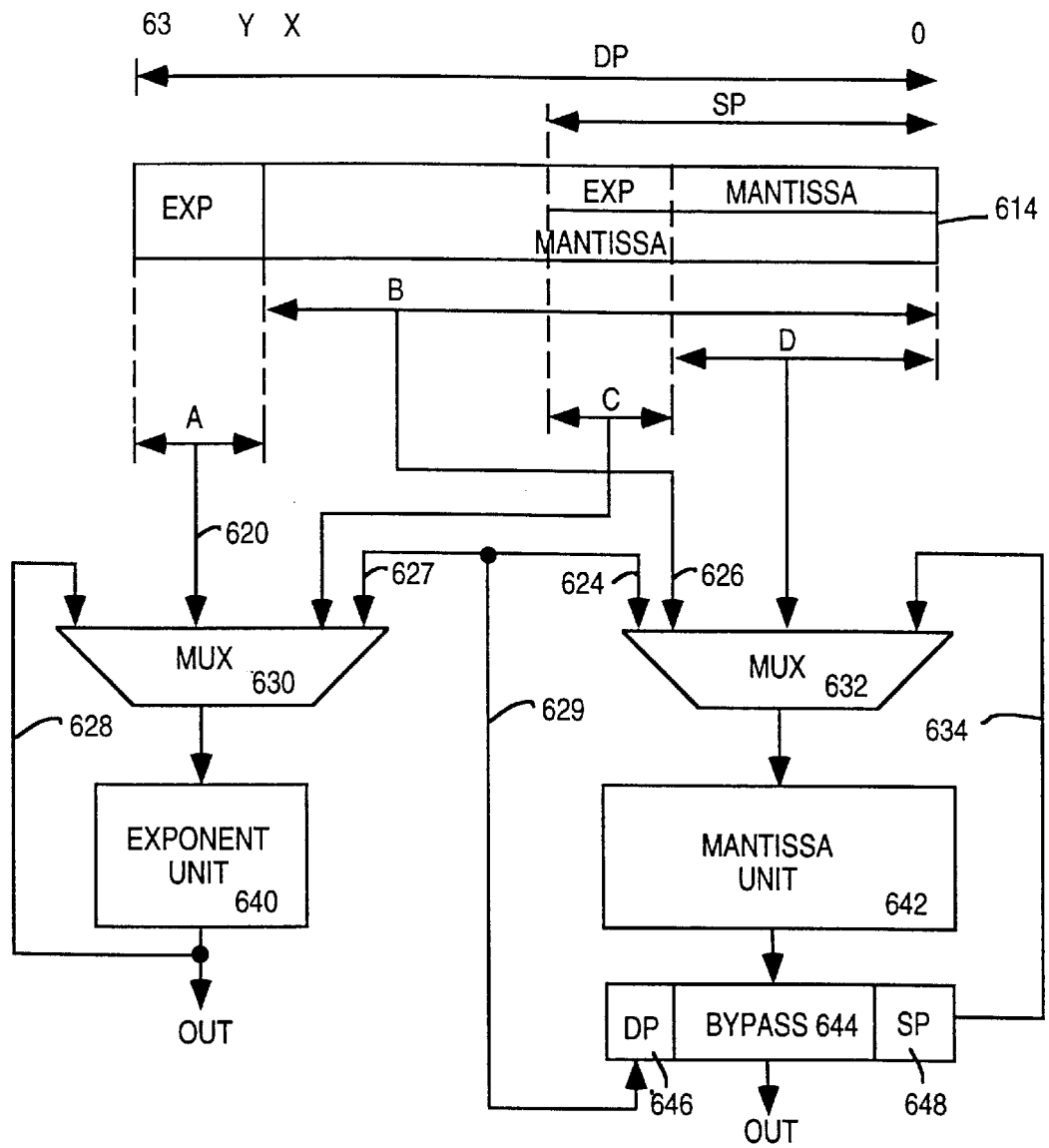
FIG. 6B illustrates data bypasses using scalar and vector registers according to one embodiment of the invention.

General purpose registers typically have same number of bits for each register, such as 64 bits or 128 bits. Since each register can potentially pack more than one vector values, knowledge with regard to data format, such as scalar or vector, of each register format will enhance overall system performance. It should be appreciated that each general purpose register may contain more than one vector values or vector registers. For example, a 128-Bit general purpose register may contain four 32-bit vector registers. Consequently, an instruction specifies operand format will improve data manipulation between vector and scalar values. The execution unit 130 uses specific information provided by the instruction for data implementations, such as data bypasses, data pack, and data unpack. FIGS. 6A and 6B illustrate an example of data bypasses with the knowledge operand format.

FIG. 6A illustrates floating point data structures 600 according to one embodiment of the invention. Floating point data structure 600 typically contains two segments where the first segment is the exponent and the second segment is the mantissa, as shown in block 602. Block 604 shows a single precision floating point data structure where the exponent and mantissa are situated between bit 0 and bit 31. It should be noted that the bit position between bit 32 and bit 63 are not used for a single precision floating point data structure.

Block 612 illustrates a double precision floating point data structure where the mantissa is situated between bit 0 and bit x while the exponent is situated between bit y and bit 63. X and y can be any value between 1 to 62. In one embodiment, both single and double precision floating point data structures are employed. Accordingly, a general purpose register could contain multiple single precision vector values where each single precision vector value contains the exponent and the mantissa portions.

FIG. 6B exemplifies a logic diagram 613 manipulating floating point data according to one embodiment of the invention. The logic diagram 613 includes a general purpose register 614, two multiplexors 630, 632, an exponent unit 640, a mantissa unit 642, and a bypass circuit 644. For this example, the register 614 contains either a 32-bit single precision floating point data or a 64-bit double precision floating point data.

In operation, exponent data moves to the exponent unit 640 while mantissa moves to the mantissa unit 642. In one embodiment, if the floating point data stored in the register 614 is a single precision, the exponent unit 640 receives the exponent data from C portion of the register 614. Likewise, if the floating point data stored in the register 614 is a double precision, the exponent unit receives the exponent data from A portion of the register 614.

If the floating point data stored in the register 614 is a single precision, the mantissa unit 642 receives the mantissa data from D portion of the register 614. Similarly, if the floating point data stored in the register 614 is a double precision, the mantissa unit 642 receives the mantissa data from B portion of the register 614. Accordingly, when the execution unit 130 has the information of data formats, such as vector versus scalar, unpacking vector values from a register can be avoided.

In another embodiment, if the floating point data is a single precision data, the exponent unit 640 can bypass the output of the exponent unit 640 back to the multiplexor 630 via bus 628 and the mantissa unit 642 can bypass the output of the mantissa unit 642 to the multiplexor 632 via bus 634. On the other hand, if the floating point data is a double precision and the next operation is a single precision operation, the mantissa unit 642 may have to bypass its output to both multiplexor 630 and 632 because the output of the mantissa unit 642 may contain the exponent data as well as the mantissa data.

Figure 7:
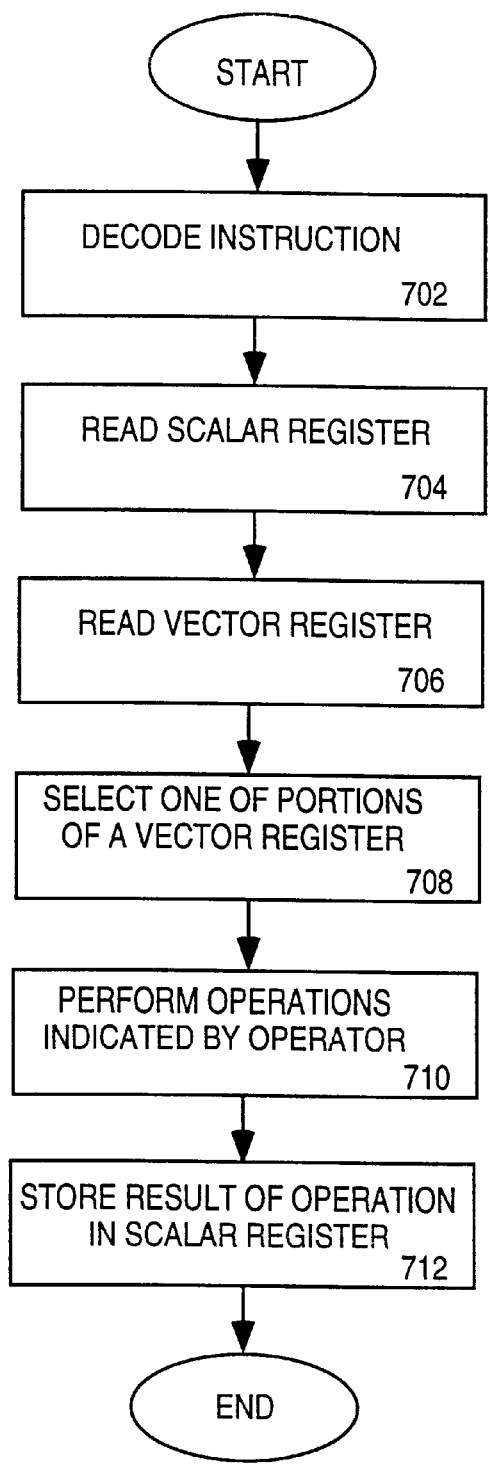
FIG. 7 is a flowchart illustrating that one operand comes from a vector register according to one embodiment of the invention.

FIG. 7 is a flowchart 700 illustrating a logical operation that one operand comes from a vector register while the another operand comes from a scalar register in accordance of one embodiment of the invention.

The process starts at the start block and proceeds to block 702 where a instruction is being decoded. Upon completion of decoding, the process proceeds to block 704 where a first operand is read from a scalar register. After obtaining the first operand, the process proceeds to block 706 where a vector register 13 is read. Upon complete reading of the vector register, the process proceeds to block 708 where a second operand is obtained from a portion of the vector data. After block 708, the process moves to block 710 where the process performs a logical operation indicated by an operator. Upon completion of the operation, the process moves from block 710 to block 712 where the result of the operation is stored in a scalar register. After storing the result data, the process ends.

Figure 8:
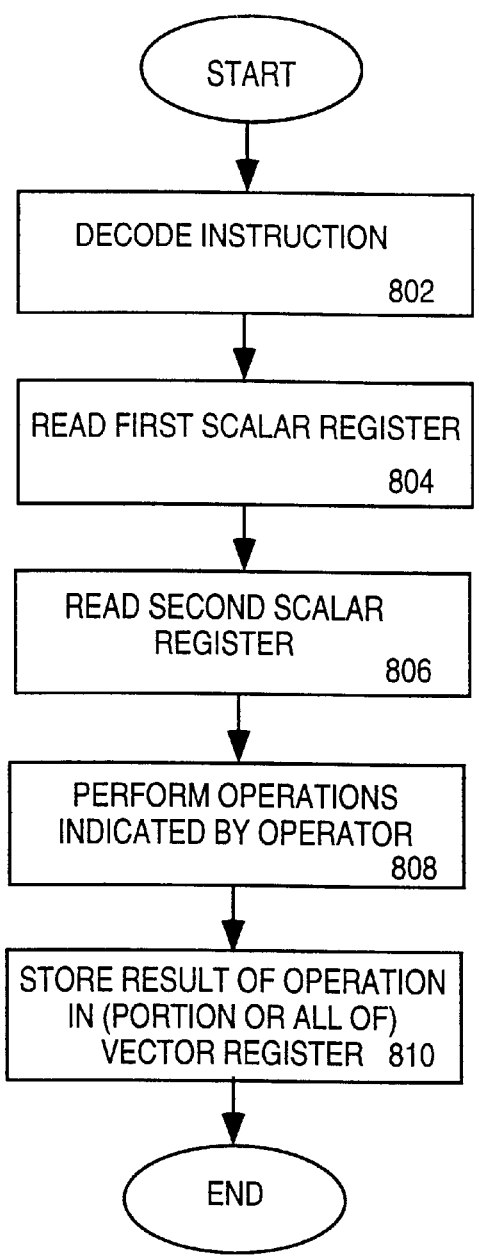
FIG. 8 is a flowchart illustrating that the result of the operation is stored in a vector register according to one embodiment of the invention.

FIG. 8 is a flowchart 800 illustrating a logical operation that the result of the operation is stored in a vector register according to one embodiment of the invention.

The process starts at the start block and proceeds to block 802 where a instruction is being decoded. Upon completion of decoding, the process proceeds to block 804 where a first operand is read from a scalar register. After obtaining the first operand, the process proceeds to block 806 where a second operand is read from a scalar register. Upon finish reading the scalar register, the process proceeds to block 808 where the process performs a logical operation indicated by an operator. Upon completion of the operation, the process moves from block 808 to block 810 where the result of the operation is stored in a vector register. After storing the result data, the process ends.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of manipulating data in a digital processor, said method comprising:

identifying a first data in a first scalar register;

identifying a second data in a vector register, wherein said vector register is partitionable into partitions, each of which storing one of a plurality of components of a vector;

performing an operation between said first and second data in response to an operator; and storing result of said operation to a second scalar register.

2. The method of claim 1, wherein said operation includes performing an arithmetic operation and wherein said result is manipulated in later operations as a scalar value having one data component.

3. The method of claim 1, wherein said identifying said first data in said first scalar register includes determining a lower portion of said first scalar register, and storing said first data in said first scalar register and wherein said identifying said second data comprises selecting a portion of said vector register and performing said operation on said portion.

4. The method of claim 1, wherein said identifying said second data in said vector register includes determining an upper vector register and storing said second data.

5. The method of claim 1, wherein said identifying said second data in said vector register includes determining a lower vector register and wherein said first data and said second data are scalar values.

6. The method of claim 1, wherein said operation further includes performing a data conversion operation.

7. The method of claim 1, wherein said storing result of said operation to said second scalar register includes storing said result to a lower portion of said second scalar register and wherein said said first and said second scalar registers are the same scalar register.

8. The method of claim 1, wherein said identifying a second data in a vector register includes selecting a vector register from at least two vector registers embedded in a general purpose register.

9. A digital processing-implemented method responsive to the execution of a single instruction comprising:

fetching a first operand from a first scalar register;
fetching a second operand from a vector register;
performing an operation between said first and second operands in response to an operator; and
storing result of said operation to a second scalar register, wherein said single instruction specifies the scalar/vector state of said first operand, said second operand, and said result.

10. The method of claim 9, wherein said operation includes performing an arithmetic operation and wherein said method comprises decoding said single instruction which specifies the scalar/vector state of said first scalar register, said vector register and said second scalar register.

11. The method of claim 9, wherein said fetching said first operand from said first scalar register includes determining a lower portion of said first scalar register.

12. The method of claim 9, wherein said fetching said second operand from said vector register includes identifying an upper vector register.

13. The method of claim 9, wherein said fetching said second operand from said vector register includes identifying a lower vector register.

14. The method of claim 9, wherein said fetching a second operand from a vector register includes selecting a vector register from at least two vector registers embedded in a general purpose register.

15. The method of claim 9, wherein said operation further includes performing a data conversion operation.

16. The method of claim 9, wherein said storing result of said operation to said second scalar register includes storing said result to a lower portion of said second scalar register and wherein said scalar/vector state specifies how said first operand is manipulated for bypassing.

17. A computer-implemented apparatus responsive to the execution of a single instruction comprising:
means for fetching a first operand from a first scalar register;
means for fetching a second operand from a vector register;
means for performing an operation between said first and second operands in response to an operator; and
means for storing result of said operation to a second scalar register, wherein said single instruction specifies the scalar/vector state of said first operand, said second operand, and said result.

18. The apparatus of claim 17, wherein said operation includes means for performing an arithmetic operation and wherein said method comprises means for decoding said single instruction.

19. The apparatus of claim 17, wherein said fetching said first operand from said first scalar register includes means for determining a lower portion of said first scalar register.

20. The apparatus of claim 17, wherein said means for fetching said second operand from said vector register includes means for identifying an upper vector register.

21. The apparatus of claim 17, wherein said means for fetching said second operand from said vector register includes means for identifying a lower vector register.

22. The apparatus of claim 17, wherein said operation further includes means for performing a data conversion operation.

23. The apparatus of claim 17, wherein said means for storing result of said operation to said scalar register includes means for storing said result to a lower portion of said scalar register and wherein said scalar/vector state specifies how said first operand is manipulated for bypassing.

24. The method of claim 17, wherein said means for fetching a second operand from a vector register includes means for selecting a vector register from at least two vector registers embedded in a general purpose register.

25. A digital processing system comprising:
a processor;
a storage device, coupled to said processor, having stored therein an instruction for performing mixed scalar and vector operations, said instruction, when executed by said processor, causes said processor to perform a method comprising:
A) identifying a first data in a first scalar register;
B) identifying a second data in a vector register, wherein said vector register is partitionable into partitions, each of which storing one of a plurality of components of a vector;
C) performing an operation between said first and second data in response to an operator; and
D) storing result of said operation to a second scalar register.

26. The system of claim 25, wherein said operation includes performing an arithmetic operation and wherein said result is manipulated in later operation as a scalar value having one data component.

27. The system of claim 25, wherein said identifying said first data in said scalar register includes determining a lower portion of said scalar register, and storing said first data in first scalar register and wherein said identifying said second data comprises selecting a portion of said vector register and performing said operation on said portion.

28. The system of claim 25, wherein said identifying said second data in said vector register includes determining an upper vector register and storing said second data.

29. The system of claim 25, wherein said identifying said second data in said vector register includes determining a lower vector register and wherein said first data and said second data are scalar values.

30. The system of claim 25, wherein said operation further includes performing a data conversion operation.

31. The method of claim 25, wherein said identifying a second data in a vector register includes selecting a vector register from at least two vector registers embedded in a general purpose register.

32. An article of manufacture for use in a computer system for allowing a digital processing-implemented method in response to execution of a single instruction, the article of manufacture comprising a computer usable medium having computer readable program code embodied in the medium, the method including:
fetching a first operand from a first scalar register;
fetching a second operand from a vector register;
performing an operation on said first and second operands in response to an operator, said operation including a data conversion operation; and
storing result of said operation to a second scalar register.

33. The article of manufacture of claim 32, wherein said performing said operation includes means for performing an arithmetic operation.

34. The article of manufacture of claim 32, wherein said fetching said first operand from said scalar register includes means for identifying a lower portion of said scalar register.

35. The article of manufacture of claim 32, wherein said fetching said second operand from said vector register includes means for determining an upper vector register.

36. The article of manufacture of claim 32, wherein said fetching said second operand from said vector register includes means for identifying a lower vector register.

37. The article of manufacture of claim 32, wherein said storing result of said operation to said scalar register includes means for storing said result to a lower portion of said scalar register.

38. The article of manufacture of claim 32, wherein said fetching a second operand from a vector register includes selecting a vector register from at least two vector registers embedded in a general purpose register.

39. A method of manipulating data in a digital processor, said method comprising:
   identifying a first data in a first scalar register;
   identifying a second data in a second scalar register;
   performing an operation between said first and second data in response to an operator; and
   storing result of said operation to a vector register, wherein said vector register is partitionable into partitions, each of which storing one of a plurality of components of a vector.

40. The method of claim 39, wherein said operation includes performing an arithmetic operation and wherein said result is manipulated in later operation as a vector value.

41. The method of claim 39, wherein said identifying said first data in said first scalar register includes determining a lower portion of said first scalar register, and storing said first data in said first scalar register, and wherein said storing said result of said operation to said vector register includes selecting a portion of said vector register and storing said result to said portion of said vector register.

42. The method of claim 39, wherein said storing said result of said operation to said vector register further includes selecting an upper vector register and storing said result.

43. The method of claim 39, wherein said storing said result of said operation to said vector register further includes selecting a low vector register and storing said result.

44. The method of claim 39, wherein said operation further includes performing a data conversion operation.

45. The method of claim 39, wherein said first and second scalar registers are the same scalar register.

46. A digital processing-implemented method responsive to the execution of a single instruction comprising:
   fetching at least two operands from a plurality of scalar registers;
   performing an operation between said operands in response to an operator; and
   storing result of said operation to a vector register, wherein said vector register is partitionable into partitions each for storing one of a plurality of components of a vector.

47. The method of claim 46, wherein said operation includes performing an arithmetic operation.

48. The method of claim 46, wherein said fetching at least two operands from a plurality of scalar registers further includes identifying portions of said scalar register to be fetched.

49. The method of claim 46, wherein said operation further includes performing a data conversion operation.

50. The method of claim 46, wherein said scalar/vector state specifies how said first operand is manipulated for bypassing.

51. A digital processing system comprising:
   a processor;
   a storage device, coupled to said processor, having stored therein a set of instructions for performing mixed scalar and vector operations, said instruction, when executed by said processor, causes said processor to perform a method comprising:
   A) identifying a first data in a first scalar register;
   B) identifying a second data in a second scalar register;
   C) performing an operation between said first and second data in response to an operator; and
   D) storing result of said operation to a vector register, wherein said vector register is partitionable into partitions each of which is for storing one of a plurality of components of a vector.

52. The system of claim 51, wherein said operation includes performing an arithmetic operation and wherein said result is manipulated in subsequent operations as a vector value.

53. The system of claim 51, wherein said identifying said first data in said first scalar register includes determining a lower portion of said first scalar register, and storing said first data in said first scalar register, and wherein said storing said result of said operation to said vector register includes selecting a portion of said vector register and storing said result to said portion of said vector register.

54. The system of claim 51, wherein said storing said result of said operation to said vector register further includes selecting an upper vector register and storing said result.

55. The system of claim 51, wherein said storing said result of said operation to said vector register further includes selecting a low vector register and storing said result.

56. The system of claim 51, wherein said operation further includes performing a data conversion operation.

57. The system of claim 51, wherein said first and second scalar registers are the same scalar register.

58. An article of manufacture for use in a computer system for allowing a digital processing-implemented method in responsive to execution of a single instruction, the article of manufacture comprising a computer usable medium having computer readable program code embodied in the medium, the program code including:
   identifying a first data in a first scalar register;
   identifying a second data in a second scalar register;
   performing an operation between said first and second data in response to an operator; and
   storing result of said operation to a vector register, wherein said vector register is partitionable into partitions each of which is for storing one of a plurality of components of a vector.

59. The article of manufacture of claim 58, wherein said means for performing said operation includes performing an arithmetic operation.

60. The article of manufacture of claim 58, wherein said identifying said first data in said first scalar register includes determining a lower portion of said first scalar register, and storing said first data in said first scalar register, and wherein said storing said result of said operation to said vector register includes selecting a portion of said vector register and storing said result to said portion of said vector register.

61. The article of manufacture of claim 58, wherein said storing said result of said operation to said vector register further includes selecting an upper vector register and storing said result.

62. The article of manufacture of claim 58, wherein said storing said result of said operation to said vector register further includes selecting a low vector register and storing said result.

63. The article of manufacture of claim 58, wherein said operation further includes performing a data conversion operation.

* * * * *